United States Patent [19]

Strömberg

[11] Patent Number: 5,131,287
[45] Date of Patent: Jul. 21, 1992

[54] STEERING WHEEL ROD WITH SLIDING AND TILTING MOVEMENTS

[75] Inventor: Kurt Strömberg, Thermaeniusgaatan, Sweden

[73] Assignee: FFV Autotech Aktiebolag, Eskilstuna, Sweden

[21] Appl. No.: 659,384

[22] PCT Filed: Oct. 25, 1989

[86] PCT No.: PCT/SE89/00590

§ 371 Date: Mar. 4, 1991

§ 102(e) Date: Mar. 4, 1991

[87] PCT Pub. No.: WO90/05082

PCT Pub. Date: May 17, 1990

[30] Foreign Application Priority Data

Oct. 31, 1988 [SE] Sweden .................. 8803943

[51] Int. Cl.$^5$ .......................... B62D 1/18; G05G 5/16
[52] U.S. Cl. ........................ 74/493; 74/531; 280/775
[58] Field of Search ............... 74/493, 531; 280/775

[56] References Cited

U.S. PATENT DOCUMENTS

| 1,619,980 | 3/1927 | Kelsey | 74/493 |
| 4,046,024 | 8/1977 | Brouckson | 74/493 |
| 4,307,626 | 12/1981 | Sanada et al. | 74/493 |
| 4,476,741 | 10/1984 | Yamaguchi | 74/493 |
| 4,539,861 | 9/1985 | Nishikawa | 74/493 |
| 4,554,843 | 11/1985 | Anderson | 74/493 |
| 4,656,888 | 4/1987 | Schmitz | 74/531 X |
| 4,784,278 | 11/1988 | Luscombe | 74/531 X |
| 4,788,880 | 12/1988 | Kester | 74/493 |
| 4,915,412 | 4/1990 | Yuzuriha et al. | 74/493 X |

FOREIGN PATENT DOCUMENTS

| 1780061 | 1/1972 | Fed. Rep. of Germany . |
| 2430546 | 1/1976 | Fed. Rep. of Germany ...... 74/493 |
| 2360454 | 3/1978 | France . |

Primary Examiner—Allan D. Herrmann
Assistant Examiner—David W. Laub
Attorney, Agent, or Firm—Nilles & Nilles

[57] ABSTRACT

A steering wheel rod support for vehicles, which is designed in such a way that it partly can be displaced a distance essentially in the longitudinal direction of the steering wheel rod (15) and partly can be tilted in a vertical plane about a transverse spindle (19), and which comprises fastening means (1), such as a stationary, stable box, by means of which the entire steering wheel rod support can be mounted in the vehicle, a bearing housing (2) for the steering wheel rod, lock plates (3) fastened in the bearing housing (2), lock means (4), which cooperates with the lock plates and is designed to lock the steering wheel rod support in an adjusted position, as well as actuation means (5) for the lock means, the lock plates (3) being able to be actuated by means of two cooperating, longitudinally directed pistons (20, 21), which are designed to be able to press the lock plates (3) against the sides (7) of the box (1) in order to obtain a friction locking between the lock plates (3) and the sides (7) of the box (1) and a locking of the steering wheel rod support and a release thereof respectively in order to obtain the desired adjustment being accomplished by means of a lever (25), which actuates the lock pistons (20, 21) as a double-armed lever arm.

10 Claims, 4 Drawing Sheets

STEERING WHEEL ROD WITH SLIDING AND TILTING MOVEMENTS

BACKGROUND OF THE INVENTION

The present invention relates to a steering wheel rod support for vehicles, which support is designed partly to be displaced a distance in the axial direction of the steering wheel rod and partly to be tilted about a transverse spindle (axis).

Such steering wheel rod supports have to meet many different requirements, which individually can be solved in different ways, but these solutions can be difficult to combine in the same steering wheel rod support. Besides the general requirement that a device of this type has to be simple and inexpensive to manufacture and mount in vehicles, the following illustrative requirements can be mentioned:

The steering wheel rod support must be stable and be able to resist all the stresses, which may materialize, without being damaged;

No play whatsoever must be present;

Sliding and tilting movements must not seem flabby or sluggish and no other movements than the required movements must be possible;

The devices, which accomplish the sliding and tilting possibilities, must be placed in such a way, that they do not obstruct or interrupt other functions in the vehicle;

The lock devices for the sliding and tilting movements must be safe and efficient in order not to allow any unintentional readjustments;

The lock devices for the sliding and tilting movements must be easily accessible and easy to actuate; and The pivoting spindle for the tilting function must be located comparatively close to the steering wheel in order to give the steering wheel a pronounced angular change when a tilting takes place, etc.

Many different constructions of slideable and tiltable steering wheel rod supports are known, all of which are burdened with deficiencies or inconveniences in some respects.

DESCRIPTION OF THE PRIOR ART

French patent publication number 2.360. 454 (Chrysler France) relates to a slidable and tiltable steering wheel rod support, in which the tilting spindle is located at a comparatively large distance from the steering wheel, which results in that the steering wheel, when a tilting is done, assumes a very small angular change, depending on the long pivoting radius between the steering wheel and the tilting spindle. Also, the lock plates, which necessarily are somewhat resilient in order to obstruct the sliding the tilting movement, form mounting and suspension means for the entire steering wheel rod support in the car, which means that the support will be resilient and somewhat instable and can be experienced as unstable and resilient. Also, it may be difficult to carefully steer the sliding and tilting movements, and it is difficult and heavy to actuate the lock devices of the slidable and tiltable steering wheel rod support and the required stable locking action is normally not obtained, and the steering wheel rod support jointly with the steering wheel might unintentionally readjust while driving.

German document 17 80 061, laid open to public inspection (Daimler Benz), relates to a steering wheel rod support, which mainly has the same inconveniences as the known construction discussed above.

SUMMARY OF THE INVENTION

The purpose of the present invention is to solve the problem of producing a steering wheel rod support, which is not burdened with the deficiencies of the already known constructions and which fulfills the considerable requirements stated above for a steering wheel rod support having a sliding and tilting function.

In accordance with the present invention the steering wheel rod support comprises a fastening means, such as a stationary, stable box, by means of which the entire steering wheel rod support can be mounted in the vehicle a bearing housing for the steering wheel rod, lock plates fastened to the bearing housing, a lock device which cooperates with the lock plates and is designed to lock the steering wheel rod support in an adjusted position, as well as an actuation device for the lock device.

The bearing housing, jointly with the steering wheel rod, is, by means of sliding grooves or the like in the fastening means and in the lock plates, mounted in such a way, in the fastening device, that partly it can be displaced in a longitudinal direction and partly be tilted into any adjusted longitudinal position whatsoever about a tilting link, which is located comparatively close to the steering wheel.

Through this constructive design the following advantages are obtained:

Lateral forces and torsional moments are transmitted from the bearing housing to the fastening means or the box via the tilting link, consequently only insignificantly via the lock plates. In this way the steering wheel rod will obtain a very good stability and freedom of play, when the mechanism is locked as well as when sliding and tilting adjustments are performed and the mechanism is open;

The tilting link can be located at a high level and close to the steering wheel, and yet no parts of the steering wheel rod support will have to be moved upwards towards the steering wheel;

The lock devices can be located at a large distance from the tilting link of the bearing housing, the lock devices in this way functioning with a large lever arm; and The lock devices can, in a simple way, be designed as a large double-armed lever arm, which with very little friction actuates two lock pistons, which actuate the lock plates and fastening devices.

BRIEF DESCRIPTION OF THE DRAWINGS

The present invention will now be described in more detail, reference being made to the accompanying drawings, which show two exemplifying embodiments of the steering wheel rod support according to the invention. The shown and described embodiments are of course not limiting, but several variations and modifications are possible within the scope as defined by the attached patent claims.

In the drawings

DESCRIPTION OF THE PREFERRED EMBODIMENT

Figure 1:
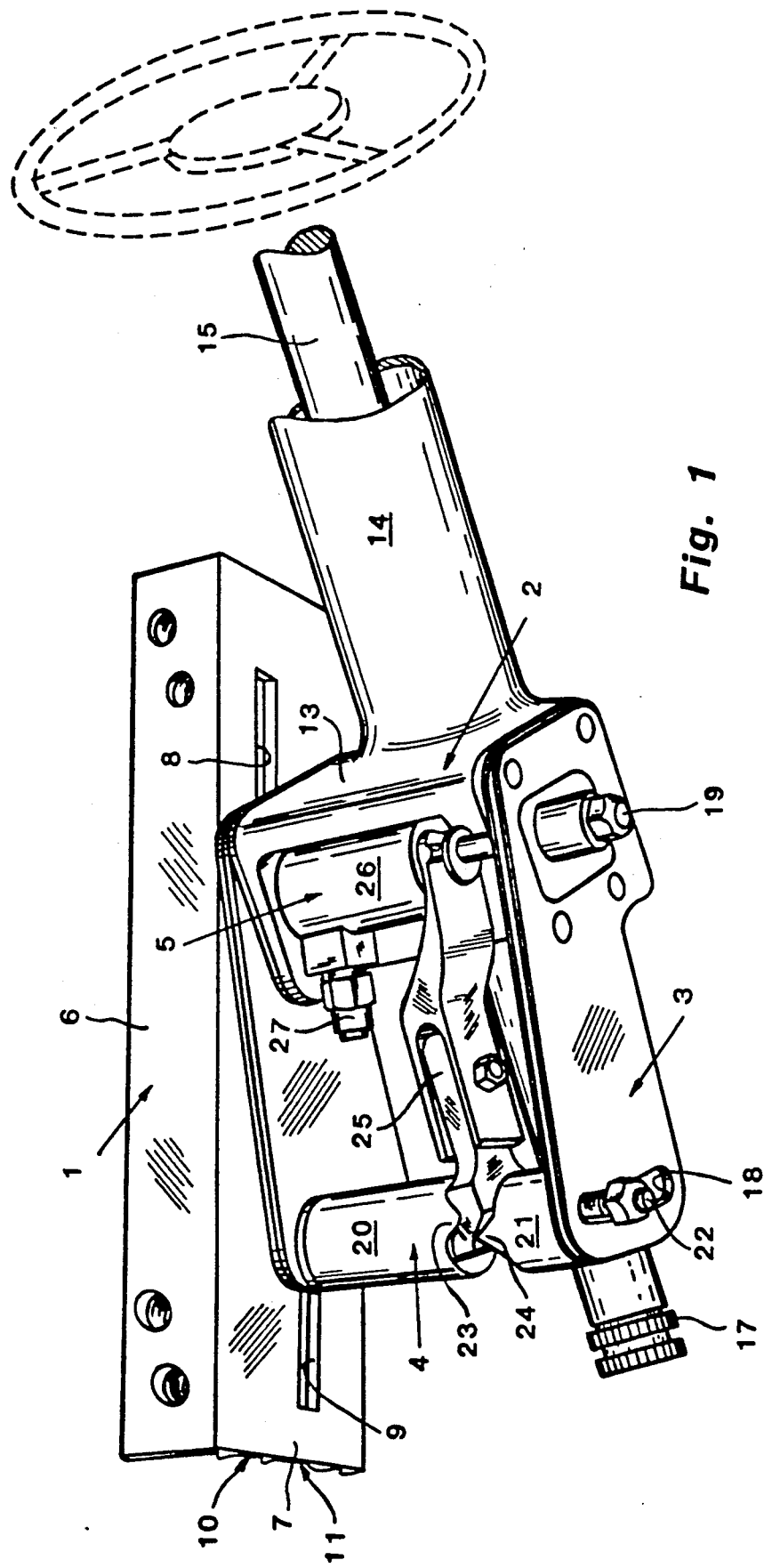
FIG. 1 shows in fragments one embodiment of a steering wheel rod support according to the invention, seen obliquely from above and in a lateral view.
Figure 2:
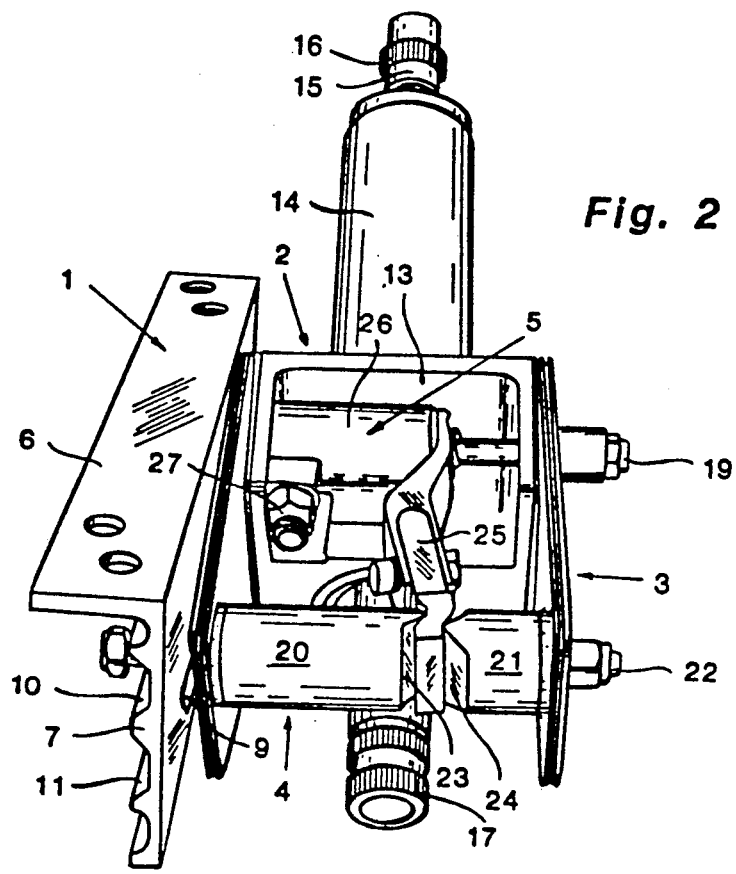
FIG. 2 shows the same device, seen from above and from the front.
Figure 3:
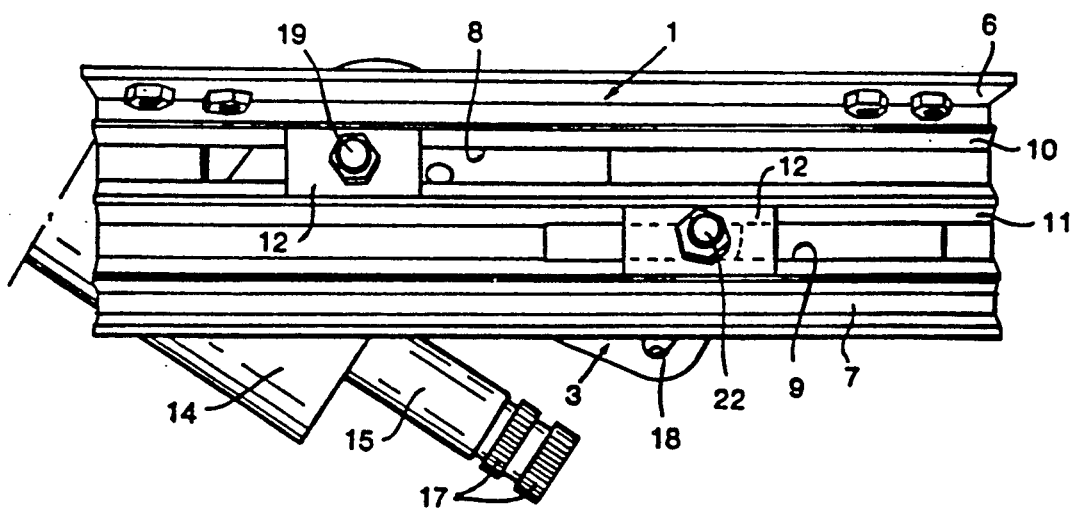
FIG. 3 shows this device in a lateral view.

The steering wheel rod support, shown in fragments in FIGS. 1, 2 and 3, generally comprises stationarily mounted or mountable fastening means 1, which is called a box, a bearing housing 2 for the steering wheel rod, elongated lock plates 3, which are fastened to bearing housing 2 and projected from the same, lock means 4, fastened to the outer ends of the lock plates, and actuation means 5 for the lock means.

The stationary or stationarily mounted box can be designed as a turned U-shaped bracket having webs and legs, but it is shown in FIGS. 1-3 designed as two separate L-shaped angle bars, foot 6 on the bar being designed to be screwed or in another way fastened to the bottom side of some supporting part of the vehicle, and bar 7 of the L-bar forms mounting bars for the active parts of the steering wheel bar support. For this reason each mounting bar 7 is designed with two elongated slots 8 and 9, clearly shown in FIGS. 1 and 3, which slots in this case extend at somewhat different levels in the bar and overlap each other. On the exterior side the slots are connected to V-shaped sliding grooves 10 and 11 respectively, which are designed to cooperate with friction reducing sliding bodies 12.

Bearing housing 2 forms a solid plate support 13, in which a steering wheel rod tube 14 is fastened. A steering wheel rod 15 extends through wheel rod tube 14 and through plate support 13 and is rotatably but axially non-movably mounted, in a way known per se, in these parts. In its upper part wheel rod 15 is provided with splines 16 in order to attach a steering wheel and in its lower end it is provided with splines 17 in order to attach a universal joint (not shown) and other means designed to transmit the steering wheel movements to the steering system of the vehicle.

On each side of plate support 13 lock plates 3 are fastened, which project in the longitudinal direction of the device a small distance from the plate support. In the case shown there are two lock blades on each side, and in a few places spacers, such as washers, are mounted between the plates. Adjacent to its outer ends lock plates 3 are provided with arched slots 18, designed to tilt the wheel rod support about a spindle 19, which extends through bearing housing 13 and through one of said longitudinal slots 8 in the mounting bars 7. Plate support 13, with its lock plates 3, is designed to be, by means of spindle 19, fastened, having a slight slip fit, between mounting bars 7, facilitated by sliding bodies 12, and outer nuts.

In order to lock the mechanism there are provided two sleeve-shaped pistons 20 and 21, which are retained by a bolt 22, which extends through pistons 20,21, through lock plates 3 and through mounting bars 7 and are locked on the exterior side of the latter by means of sliding bodies 12 and nuts. The pistons are provided with wedge-shaped points 23,24, which in the shown case are directed essentially in a vertical direction, and the points are placed somewhat eccentrically on each side of the center of the pistons, in order to function as working surfaces for a flat lever, by means of which pistons 20 and 21 can be pressed apart. The pistons are freely displaceable on bolt 22 and abut, each one with a plane surface, the respective lock plates 3.

Actuation means 5 for pistons 20 and 21 comprises an actuation lever 25, functioning as a lever arm, which in its outer end is designed to cooperate with wedge-surfaces 23, 24 of the pistons and which with its opposite end is attached to a hydraulic, pneumatic or electric power motor 26 having a connection 27 to a pressure medium or electric current. Lever 25 is by means of motor 26 spring-loaded in a locking direction, the lever in an unactuated condition pressing lock pistons 20 and 21 apart and in this way locking plates 3 against mounting bars 7. Motor 26 can for this purpose be designed with an interior spring, the spring power of which is sufficient to keep the steering wheel rod support locked. In order to disengage the mechanism the power of the spring must be overcome by being actuated by motor 26, lever 25 unloading piston pair 20, 21, thus disengaging lock plates 3 from mounting bars 7 of the box. Then the steering wheel rod support can be displaced longitudinally in slots 8 and 9 and simultaneously be tilted in slots 18 in blades 3 about spindle 19 through bearing housing 2.

Figure 4:
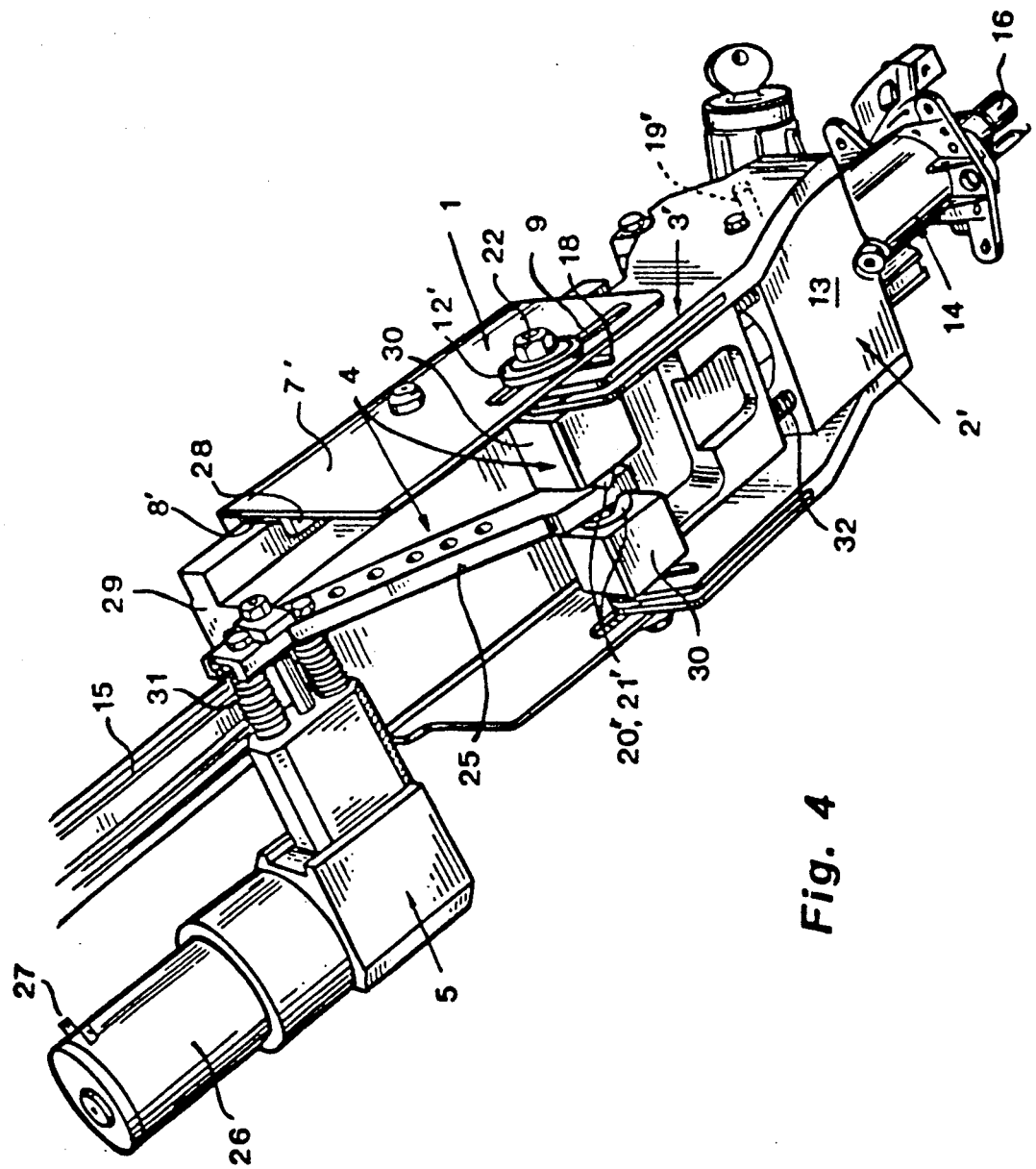
FIG. 4 shows an alternative embodiment of the invention, seen in a perspective view, obliquely from below.
Figure 5:
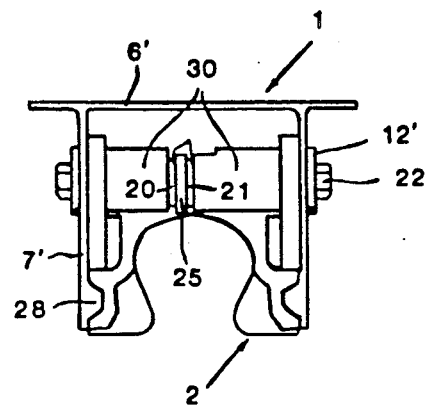
FIG. 5 shows the device in FIG. 4 seen from that end which faces the steering wheel.
Figure 6:
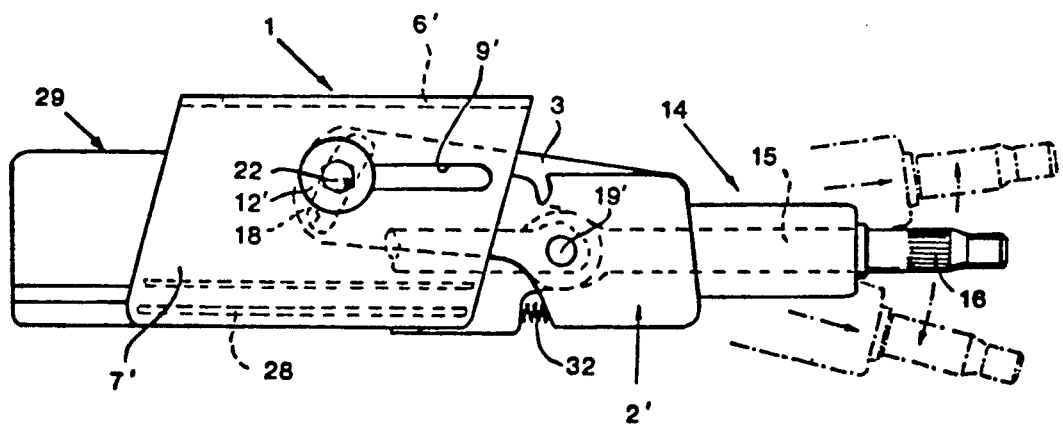
FIG. 6 shows the same device in a lateral view.

The embodiment according to FIGS. 4-6 is only different as to details from the embodiment described above. It is clearly shown in FIG. 5, that stationary box 1 in this embodiment mainly is turned U-shaped, web 6' being designed to be screwed or in another way fastened stationarily to the vehicle. On the interior side of each one of sides 7' of box 1 longitudinal guide rails 28 are provided in order to longitudinally guide a central intermediary portion 29 in the device. In one place each one of sides 7' of the box is designed with longitudinal slots 9, in which through lock bolt 22 for lock plates 3' is displaceable.

Central intermediary portion 29 forms a continuous body, which with its upper part extends into bearing housing 2' and is mounted about a transverse spindle 19', above which bearing housing 2' and its lock plates 3' and consequently also the steering wheel rod and its steering wheel can be tilted or pivoted in a vertical plane. In a lower portion intermediate portion 29 is designed with a piston guide 30, in which lock pistons 20', 21' are guided. Pistons 20', 21' are also in this embodiment designed with actuation edges, which make lever 25 function as a double-armed lever arm during a pivoting while being actuated by prestressing pistons 31. Motor 26 retracts the corresponding end of lever 25 and consequently a release of pistons 20', 21' and a detachment of lock plates 3', it being possible to displace bearing housing 2' together with the steering wheel rod and the lock plates longitudinally through a sliding in slot 9' as well as to pivot them in slots 18 about pivot spindle 19'.

About the same axis as tilting spindle 19' a merely fragmentarily shown joint coupling of steering wheel rod 15 can be pivoted. Steering wheel rod 15 is axially fastened in bearing housing 2', but it can be displaced axially jointly with plate support 13, lock blades 3' and central intermediary portion 29.

The two sets of lock plates 3, fastened on plate support 13, abut interior sides 7' of box 1 and are pressed against the same by means of spring-actuated pistons 20', 21'. The distance between tilting spindle 19' and the steering wheel is so small, that a substantial angular change of the steering wheel is obtained, when there is a tilting up or down about spindle 19', the arched plate slots 18 being used as limits. At the same time the distance between tilting spindle 19' and the arched slots 18 in the lock plates is sufficiently large to allow such a moment arm, that no particularly large forces are needed to lock lock plates 3' against sides 7' of the box in order to prevent an unintentional tilting of the steering wheel. Consequently, in many instances it may be sufficient to use just one lock plate on each side of the box. If required, the number of lock plates can of course be doubled or multiplied and the interior side of the box be designed with a correspondingly larger number of interaction surfaces, which can be interleaved with the lock plates in order to increase the number of friction surfaces between the blades and the box. Plain washers about lock bolt 22 can, when placed between double lock plates, function as additional friction surfaces in order to increase the tilting locking.

In order to prevent the steering wheel from suddenly falling downwards, when lever 25 is actuated and lock plates 3' are disengaged from the stationary box, there are provided two detent springs 32 on the lower side between central intermediary portion 29 and blade support 13. The springs are only designed, when the lock plates are disengaged, to counteract, but not prevent, a tilting down of the steering wheel and to facilitate a tilting up of the steering wheel.

The two described devices function, when the steering wheel position is to be adjusted, in such a way, that lever 25 is actuated, manually or by means of the shown motor 26, it being possible to partly displace plate support 13 and its lock blades 3 and 3', steering wheel rod and the steering wheel, while steering, in the longitudinal direction of box 1 by means of making lock bolt 22 and spindle 19 and lock bolt 22 and central intermediary portion 29 respectively slide in longitudinal slots 8, 9 and 8', 9' respectively and to partly tilt them in a vertical plane by means of pivoting plate support 13 about the transverse tilting spindle 19 and 19' respectively and pivoting plates 3 and 3' in relation to sides 7 and 7' respectively of the box and lock bolt 22, in cooperation with arched slots 18 in the plates. When the desired length and tilting position has been reached, motor 26 will be deactivated and lever 25 will press, actuated by its prestressing springs, piston pairs 20, 21 and 20', 21' outwards from each other, plates 3 then being locked against sides 7 and 7' respectively of the box between pistons 20 and 21 and 20' and 21' and lock bolt 22, and the steering wheel has in this way reached a most stable position without any play.

Lock plates can of course in an alternative embodiment be placed on the exterior sides of the box, it being possible, provided box 1 is designed and the fastening in the vehicle is done in a particular way, to pivot the steering wheel upwards as well as downwards a considerable distance. In order to lock the mechanism lever 25, with its prestressing springs, then has to be designed with a reversed function as compared to what has been described above. Also, lock bolt 22 must in this way be designed in two parts and lever 25 be designed to, when a locking is to be attained, pull the two lock bolt parts against each other and consequently lock plates 3 and 3' against box sides 7 and 7' respectively.

I claim:

1. A steering wheel rod support for vehicles, which is displaceable a distance in the longitudinal direction of the steering wheel rod (15) and tiltable about a transverse axis (19;19') and which comprises fastening means (1) for mounting the entire steering wheel rod support in the vehicle, a bearing housing (2;2') for the steering wheel rod (15), lock plates (3) fastened in the bearing housing (2;2'), lock means (4), which cooperate with the lock plates for locking the steering wheel rod support in an adjusted position, actuation means (5) for actuating the lock means, two cooperating transverse pistons (20, 21) for pressing the lock plates (3) against the fastening means (1), and the lock plates (3) being frictionally lockable against the fastening means (1).

2. The steering wheel rod support according to claim 1, wherein the lock plates (3) are fastened to the bearing housing (2;2') and the lock plates (3), adjacent to their outer ends, have arched slots (18), through which a lock bolt (22) extends, and the bearing housing (2;2'), the steering wheel rod (15) and the steering wheel being tiltable about a tilting axis (19;19') of the bearing housing (2;2').

3. The steering wheel rod support according to claim 1 wherein the fastening means (1) has longitudinal slots (8,9) in which the bearing housing (2,2') can be displaced in a longitudinal direction, and wherein the lock plates (3) and the fastening means (1), in a normal non-actuated condition, lockingly engage each other by means of a lock bolt (22), the lock bolt (22) being guidable in grooves in the lock plates (3) and grooves in the fastening means (1), the pistons (20,21) being slidable on the lock bolt (22), which extends through the arched slots (18) of the lock plates (3).

4. The steering wheel rod support according to claim 1, wherein the lock plates (3) are placed on the interior of the fastening means (1), and the transverse pistons (20,21) are actuatable in a direction away from each other in order to obtain a locking of the plates (3) against the sides fastening means (1) by means of a force-actuated, longitudinal lever (25).

5. The steering wheel rod support according to claim 1, wherein the lock plates (3) are placed on the exterior of the fastening means (1), and wherein the pistons (20,21) are pressable against each other in order to obtain a locking of the plates (3) against the fastening means by means of a pulling, force-actuated lever.

6. The steering wheel rod support according to claim 1, further comprising two sets of a plurality of cooperating lock plates (3), washers being provided between each lock plate-pair.

7. The steering wheel rod support according to claim 1, wherein the lock pistons (20, 21) have wedge-shaped points (23, 24) placed somewhat eccentrically on each side of the center of the pistons, and further comprising a lever (25) having a flat cross section placed between the lock pistons with the lever (25) being engageable with the wedge-shaped points (23, 24).

8. The steering wheel rod support according to claim 1, wherein the bearing housing (2'), with its lock plates (3), is, at its end which faces the steering wheel, pivotally connected (19') to a central intermediate portion (29), which is longitudinally displaceable in guide rails (28) disposed on the interior of the fastening means (1), and wherein the bearing housing (2'), with its lock plates (3), is lockable against being longitudinally displaced as well as being tilted by means of a lock bolt (22), which extends through the plates (3) and the lock pistons (20, 21).

9. The steering wheel rod support according to claim 8, further comprising, between the central intermediate portion (29) and the bearing housing (2'), at least one detent spring (32) placed on a level below the tilting spindle (19') and wherein the detent spring (32) is biased to prevent the steering wheel from falling when the locking between the lock plates (3) and the fastening means (1) is released.

10. The steering wheel rod support according to claim 1 wherein the fastening means (1) comprises a stationary, stable box with sides (7;7').

* * * * *